United States Patent
Kanno

(10) Patent No.: US 7,838,157 B2
(45) Date of Patent: Nov. 23, 2010

(54) FUEL CELL SYSTEM

(75) Inventor: Yoshihito Kanno, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1008 days.

(21) Appl. No.: 11/244,063

(22) Filed: Oct. 6, 2005

(65) Prior Publication Data

US 2006/0088745 A1 Apr. 27, 2006

Related U.S. Application Data

(63) Continuation of application No. PCT/JP2004/005168, filed on Apr. 9, 2004.

(30) Foreign Application Priority Data

Apr. 9, 2003 (JP) ............................. 2003-105204

(51) Int. Cl.
*H01M 8/00* (2006.01)
(52) U.S. Cl. ........................ 429/400; 429/428; 429/433; 429/434
(58) Field of Classification Search .................. 429/24, 429/400, 428, 433, 434
See application file for complete search history.

(56) References Cited

U.S. PATENT DOCUMENTS

2004/0106026 A1 6/2004 Fujita et al.

FOREIGN PATENT DOCUMENTS

| DE | 201 08 808 U1 | 9/2001 |
|---|---|---|
| EP | 1 383 193 A1 | 1/2004 |
| JP | A 7-302603 | 11/1995 |
| JP | A 11-273704 | 10/1999 |
| JP | A 2002-305017 | 10/2002 |
| JP | A 2003-203665 | 7/2003 |
| JP | A 2003-331894 | 11/2003 |
| JP | A 2004-39526 | 2/2004 |
| JP | A 2004-39527 | 2/2004 |
| JP | A 2004-39547 | 2/2004 |
| WO | WO 03/058740 A1 | 7/2003 |
| WO | WO 2004/006369 A2 | 1/2004 |

*Primary Examiner*—Jane Rhee
(74) *Attorney, Agent, or Firm*—Oliff & Berridge, PLC

(57) ABSTRACT

A fuel cell system capable of proper driving even at times of low temperature, below freezing or the like. The fuel cell system includes a fuel cell stack, piping, a pressure regulator, and a control unit. The piping discharges hydrogen or air that is used in electricity generation from the fuel cell stack. The pressure regulator regulates pressure of gases which are supplied and discharged to and from the fuel cell stack in accordance with the size of a load. The control unit judges whether or not there is a likelihood of the pressure regulator freezing, and when it is judged that there is a likelihood of freezing, prohibits a degree of openness of the pressure regulator from going below a predetermined degree of openness.

10 Claims, 4 Drawing Sheets

FUEL CELL SYSTEM

CROSS-REFERENCE TO RELATED APPLICATION

This application is a continuation of International Application No. PCT/JP04/005168 filed Apr. 9, 2004 which claims priority under 35 USC 119 from Japanese Patent Application No. 2003-105204, the disclosure of which is incorporated by reference herein.

BACKGROUND OF THE INVENTION

1. Field of the Invention

The present invention relates to driving control of a fuel cell system which generates electricity by electrochemical reaction of hydrogen with oxygen.

2. Description of the Related Art

In recent years, fuel cells which use electrochemical reactions of hydrogen with oxygen to generate electricity have been a focus of attention as energy sources. For example, one type of fuel cell, a solid polymer electrolyte fuel cell, has a structure which is provided with a stack of plurally layered cells which are formed by sandwiching a solid polymer electrolyte layer from both sides with a hydrogen electrode (which may hereafter be referred to as an anode) and an oxygen electrode (which may hereafter be referred to as a cathode).

In the fuel cell, hydrogen gas is supplied to the anode, to act as fuel, and air is supplied to the cathode, to act as an oxidizing agent. The hydrogen supplied to the anode of the fuel cell reacts with a catalyst of the anode, thus generating hydrogen ions. These hydrogen ions pass through the solid polymer electrolyte layer, initiate an electrochemical reaction with the oxygen at the cathode, and generate electricity.

Supply amounts of hydrogen gas and air that are required for the electrochemical reaction in the fuel cell (which may hereafter be referred to as "reaction gases") vary depending on a load that is applied to the fuel cell. Accordingly, a fuel cell system has been proposed in which, by controlling degrees of openness of pressure regulation valves (pressure regulators) or the like in accordance with the size of a load, flow distributions of each gas are made uniform and electricity-generating effectiveness of the fuel cell is raised (see, for example, Japanese Patent Application Laid-Open (JP-A) No. 7-302603).

However, during operation of a fuel cell, the electrochemical reaction of the hydrogen with the oxygen is accompanied by the creation of water. The created water is used for cooling in the fuel cell system and, in order to prevent ingression thereof into a pressure regulator-driving section or the like, an exhaust device is operated and the water is exhausted to outside the fuel cell (see, for example, JP-A No. 2002-305017).

If the fuel cell system is below freezing point or the like or driving is stopped for a certain period, there is a risk that water that remains in the system may freeze at locations such as valves, pumps and the like. In particular, in a fuel cell system which drives a pressure regulator as described above, when the system is controlled in accordance with the size of a load at a very low temperature, below freezing point or the like, there is a risk that the pressure regulator may be frozen in a shut state, that the valve may bite into (get caught in) the ice when the valve is closed, or the like, and a valve mechanism of the pressure regulator may become incapable of proper driving and/or damaged.

Furthermore, even in a case in which water is exhausted to outside the system by an exhaust device as described above, it is not possible to prevent adherence of water at the pressure regulator itself. Therefore, the same problems may occur.

SUMMARY OF THE INVENTION

With a view to solving the problem described above, the present invention provides a fuel cell system capable of properly driving even at times of very low temperatures, below freezing point and the like.

A fuel cell system of a first aspect of the present invention is a fuel cell system comprising: a fuel cell; gas supply/exhaust means for supplying and exhausting gas, which is used in electricity generation, to and from the fuel cell, the gas supply/exhaust means being provided with at least one valve; freezing judgment means for judging whether or not there is a likelihood of a predetermined location, which includes the at least one valve, freezing; and control means for, when the freezing judgment means judges that there is a likelihood of freezing, prohibiting a degree of openness of the at least one valve from becoming less than a predetermined degree of openness.

A fuel cell system of a second aspect of the present invention is a fuel cell system comprising: a fuel cell; gas supply/exhaust means for supplying and exhausting gas, which is used in electricity generation, to and from the fuel cell; a pressure regulator which is provided at the gas supply/exhaust means and which regulates pressure of the gas which is supplied and exhausted to and from the fuel cell in accordance with size of a load; freezing judgment means for judging whether or not there is a likelihood of a predetermined location, which includes the pressure regulator, freezing; and control means for, when the freezing judgment means judges that there is a likelihood of freezing, prohibiting a degree of openness of the pressure regulator from becoming less than a predetermined degree of openness.

A fuel cell system of a third aspect of the present invention is a fuel cell system comprising: a fuel cell which generates electricity by reaction of gases; a gas unit for supplying and exhausting the gases to and from the fuel cell, the gas unit being provided with at least one valve; and a control unit for controlling a degree of openness of the at least one valve, the control unit controlling so as to prohibit the degree of openness of the at least one valve from becoming less than a predetermined value when there is a likelihood that the at least one valve of the gas unit will freeze.

A fuel cell system of a fourth aspect of the present invention is a fuel cell system comprising: a fuel cell which generates electricity by reaction of gases; a gas unit for supplying and exhausting the gases to and from the fuel cell; a pressure regulator which is provided at the gas unit for regulating pressure of at least one of the gases supplied and exhausted to and from the fuel cell; and a control unit for controlling a degree of openness of the pressure regulator, the control unit controlling so as to prohibit the degree of openness of the pressure regulator from becoming less than a predetermined value when there is a likelihood that the pressure regulator of the gas unit will freeze.

The controller may be programmable, a program thereof including the steps of: judging whether or not there is a likelihood of the pressure regulator of the gas unit freezing; and when it is judged that there is a likelihood of freezing, controlling the pressure regulator so as to prohibit the degree of openness of the pressure regulator from becoming less than the predetermined value.

According to a fuel cell system of the present invention, in circumstances in which there is a likelihood that the fuel cell system (particularly the pressure regulator) may freeze, such as in very low temperature conditions or the like, the pressure regulator can be prohibited from going below a certain degree of openness. Thus, it is possible to prevent driving of the pressure regulator being impeded or the pressure regulator biting into (getting caught in) ice due to freezing. Accordingly, a situation in which the pressure regulator is frozen in a closed state and opening is not possible and/or the pressure regulator is damaged can be prevented, and damage to the fuel cell can be prevented.

A subject locations for which it is judged whether or not freezing is possible is a predetermined location including the pressure regulator, may be the pressure regulators itself, may be a driving system thereof, and may be the fuel cell system as a whole.

When the fuel cell system of the present invention is equipped with a temperature detector (means) for detecting temperature, it can be judged that freezing is likely when the detected temperature is below a predetermined temperature. In accordance therewith, a risk of freezing can be judged by reference to the detected temperature, and risks of freezing can be judged more accurately. The temperature detector may detect the temperature of any location as long as that temperature can determine the potential for freezing, such as an external air temperature, i.e., a temperature outside the fuel cell (which, in a case in which the fuel cell system is mounted in a vehicle, might be a temperature outside the vehicle), a temperature of a pressure regulator or a vicinity thereof, a temperature of the fuel cell itself, a temperature of piping, or the like.

Note that a reference for judgment of the likelihood of freezing in the fuel cell system of the present invention is not limited to temperature as described above, and may be pressure at a drive component, voltage at an electric component or the like.

In a case in which it is judged that there is a possibility of freezing, a control unit (controller/means) of the pressure regulator may fix the degree of openness of the pressure regulator at a predetermined degree of openness or greater. Thus, biting into ice and the like is more reliably prevented. Further, damage to the pressure regulator due to being driven at times of freezing can be avoided.

Further, with the fuel cell system of the present invention, when the fuel cell is stopped, the pressure regulator may be fixed at a predetermined degree of openness or greater by the control unit. Accordingly, because the regulator is necessarily in an open state when the fuel cell starts, the occurrence of adverse effects such as the pressure regulator becoming frozen and unopenable while the fuel cell is stopped, reaction gas pressures becoming excessively high and the fuel cell system being damaged, or the like can be prevented. Note that control to fix the pressure regulator at the predetermined degree of openness or greater when the fuel cell is stopped need not be related to the aforementioned judgments of freezing, and may be a mode which is independent thereof.

The fuel cell system of the present invention can be applied without limitation to a type of fuel cell, but is particularly excellent for solid polymer electrolyte fuel cells. Moreover, a mode in which the pressure regulator is provided at an exhaust system from the oxygen electrode sandwiching the electrolytic layer (which may hereafter be referred to as a cathode off-gas system) is preferable. This is because it is necessary, in a solid polymer electrolyte fuel cell, to employ a humidification device for mixing water with the reaction gases in order to maintain ion-conductivity of the solid polymer electrolyte layer, and because water is generated in the cathode off-gas system by the electrochemical reaction.

It is possible to apply the present invention by appropriately combining the various features described above and/or omitting one or more thereof. Furthermore, the fuel cell system of the present invention is not limited to the structure described above and can be constituted by various modes, such as a device for controlling starting of a fuel cell system, a control process, and so forth.

DETAILED DESCRIPTION OF THE INVENTION

Figure 1:
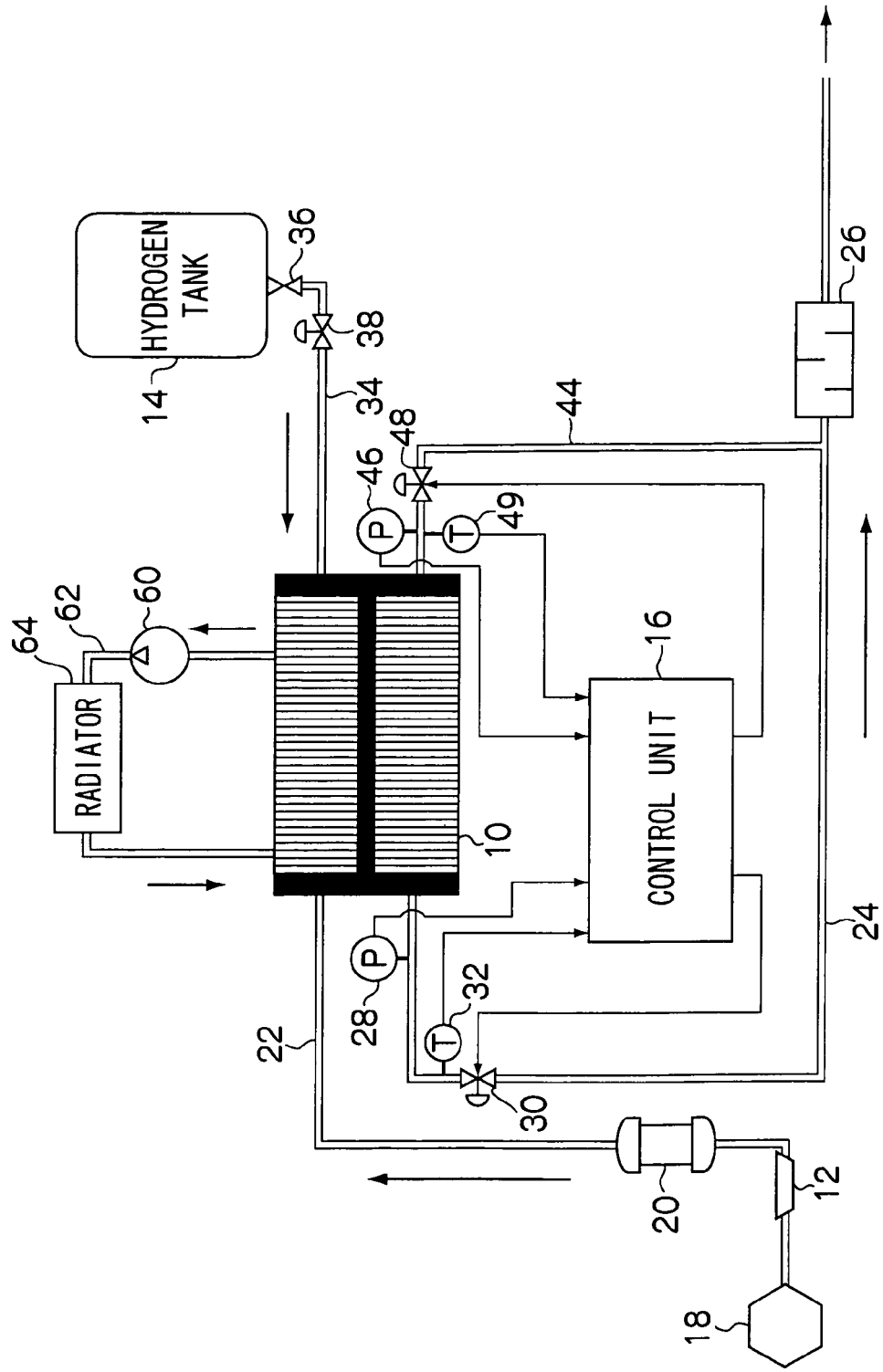
FIG. 1 is an explanatory diagram showing overall structure of a fuel cell system relating to an embodiment of the present invention.

Below, a fuel cell system of the present invention will be described in detail. First, structure of an apparatus of the present invention will be described using FIG. 1. FIG. 1 is an explanatory diagram showing overall structure of a fuel cell system of the present invention. Note that a fuel cell system of the present invention, in a present embodiment, is not necessarily mounted at a vehicle, but may be utilized in various structures of stationary types and the like which are used in ordinary households and the like. The fuel cell system of the present invention may be driven by accelerator operations by a driver to generate electricity.

In FIG. 1, the fuel cell system of the present invention is structured by a fuel cell stack 10, a compressor 12, a hydrogen tank 14 and a control unit 16. The fuel cell stack 10 is structured by stacked cells which generate electricity by electrochemical reaction of hydrogen with oxygen. Each cell has a structure in which a hydrogen electrode (an anode) and an oxygen electrode (a cathode) are disposed sandwiching an electrolytic layer, and generates electricity by movements of hydrogen ions and electrons. In the present embodiment, a solid polymer-type cell utilizing a solid polymer layer of NAFION® or the like is used as the electrolytic layer. However, the present invention is not limited thus.

Air which is compressed by the compressor 12 is supplied to the cathodes of the fuel cell stack 10 to serve as a gas that includes oxygen. The air is taken in through a filter 18 and compressed by the compressor 12. The compressed air is humidified at a humidifier 20, and is then supplied to the fuel cell stack 10 via piping 22.

Exhaust from the cathodes (cathode off-gas) is exhausted through piping 24 and a muffler 26, which is provided at the piping 24, to outside the fuel cell system. A pressure sensor 28 and a pressure regulator (pressure regulation valve) 30 are provided at the piping 24. Furthermore, a temperature sensor 32 is provided in a vicinity of the pressure regulator 30. The pressure sensor 28 and temperature sensor 32 are electrically connected (linked) with the control unit 16. The pressure sensor 28 and the pressure regulator 30 are structured so as to detect supply pressure of the supplied air and temperature of the pressure regulator 30, and send outputs to the control unit 16.

The pressure regulator 30 is equipped for regulating supply pressure of the air, and a degree of openness of the pressure regulator 30 is controlled by the control unit 16. Because structures with solid polymer electrolyte fuel cells are particularly prone to retaining water at the cathode off-gas side, control of the pressure regulator 30 by the control unit 16 at times of freezing is very significant.

The anodes of the fuel cell stack 10 are connected by piping 34 with the hydrogen tank 14, at which high-pressure hydrogen is stored. The hydrogen is supplied to the anodes of the fuel cell stack 10 from the hydrogen tank 14. Note that the present embodiment is a mode in which the hydrogen tank 14 is provided, but this mode is not limiting. Modes in which, instead of the hydrogen tank 14, hydrogen is generated by a reformulation reaction with an alcohol, a hydrocarbon, an aldehyde or the like as a raw material and this hydrogen is supplied to the anode are also possible.

A shutting valve 36 is provided at an output port of the hydrogen tank 14, and a regulator 38 is provided at the piping 34. When the hydrogen that has been stored in the hydrogen tank 14 is supplied to the anodes, pressure and supply amounts are regulated by the shutting valve 36 and the regulator 38. Further, exhaust from the anodes (which may hereafter be referred to as anode off-gas) is exhausted by piping 44. A pressure sensor 46 and a pressure regulator (pressure regulation valve) 48, which are electrically connected with the control unit 16, are provided at an output port of the anodes. A degree of openness of the pressure regulator 48 is controlled in accordance with a supply pressure of hydrogen, which is detected by the pressure sensor 46, and the pressure regulator 48 is structured so as to regulate supply pressures and supply amounts to the anodes. A temperature sensor 49 is provided in a vicinity of the pressure regulator 48. The temperature sensor 49 detects temperature of the pressure regulator 48, and sends outputs to the control unit 16, to which the temperature sensor 49 is electrically connected. Further, in order to reduce amounts of hydrogen that are exhausted through the pressure regulator 48 to the piping 44, the pressure regulator 48 is controlled in co-ordination with pressure regulation at the regulator 38. That is, when the pressure regulator 48 is fixed at a larger degree of openness, the regulator 38 is controlled so as to be tighter. Thus, amounts of hydrogen that are exhausted to the piping 44 can be reduced. One end of the piping 44 is connected to the piping 24, and is structured such that anode gas is exhausted through the muffler 26.

As well as the hydrogen and oxygen, cooling water for temperature control is supplied to the fuel cell stack 10. The cooling water is caused to flow through piping 62 for cooling, by a pump 60, is cooled at a radiator 64, is supplied to the fuel cell stack 10, and is used for controlling temperature of the fuel cell stack 10 to a certain level.

The control unit 16 is electrically connected to the pressure sensor 28, the pressure regulator 30, the temperature sensor 32, the pressure sensor 46, the pressure regulator 48 and the temperature sensor 49. Pressures and temperatures that are detected by each of the pressure sensor 28, the temperature sensor 32, the pressure sensor 46 and the temperature sensor 49 are inputted to the control unit 16 as measurement signals. On the basis thereof, control signals are outputted to the pressure regulator 30 and the pressure regulator 48 to control degrees of openness of the regulators. Further, although not illustrated, the control unit 16 is structured to output control signals to the compressor 12, the shutting valve 36 and the like, so as to be able to control the same.

Next, control of the pressure regulators by the control unit 16 will be described. During usual driving, the control unit 16 judges the size of a load that is being applied to the fuel cell stack 10 on the basis of the measurement signals that are inputted by the pressure sensors, controls the degrees of openness of the regulators within a range of 0 to 100% in accordance with such judgments, and regulates supply pressures and supply amounts of the supplied gases. Further, in addition to controlling pressures and the like, such as the supply pressures, the control unit 16 judges whether or not there is a possibility that the pressure regulators 30 and 48 will become frozen on the basis of the temperatures detected by the temperature sensor 32 and the temperature sensor 49.

When the temperatures detected by the temperature sensors 32 and 49 fall below predetermined temperatures, the control unit 16 judges that there is a likelihood that the pressure regulators 30 and 48 will freeze, and prohibits the degrees of openness of the pressure regulators 30 and 48 from going below predetermined degrees of openness. The predetermined temperatures are temperatures which are determined beforehand to be temperatures at which there is a likelihood of freezing, and will usually be set in the vicinity of 0° C.

The predetermined degrees of openness are similarly determined beforehand. In a case in which the predetermined degrees of openness are set to, for example, 50%, the control unit 16 performs control such that the degrees of openness of the pressure regulators 30 and 48 are driven within a range of 50 to 100% during driving. Now, the present embodiment is a mode in which the predetermined degrees of openness are set to 50% and control is performed so as to drive within a range of 50 to 100% during driving when there is a likelihood of freezing. However, a structure is also possible in which the degrees of openness of the pressure regulators 30 and 48 are fixed at a predetermined degree of openness or greater during driving when it has been judged that there is a likelihood of freezing. Hence, control to regulate the degrees of openness of the pressure regulators 30 and 48 is not performed at all during freezing, and the pressure regulators 30 and 48 digging into (getting caught in) ice can be more reliably prevented.

Further, at a time when the fuel cell system is stopped and electric power is not supplied to the vehicle, such as when an ignition switch is turned off, the vehicle stops moving for a certain amount of time and the like, the control unit 16 fixes the degrees of openness of the pressure regulators 30 and 48 at at least the predetermined degrees of openness (for example, at 100%). As a result, the pressure regulators 30 and 48 becoming frozen and undrivable while the fuel cell system stops, and supply pressures of the reaction gases being excessively high and causing damage or the like when the system is subsequently restarted can be prevented. As a fixed degree of openness at such a time, a predetermined value within the range of 50 to 100% is favorable. Further, a structure is also possible in which, when the pressure regulators 30 and 48 are being controlled within a range of, for example, 50 to 100%, the degree of openness is maintained and fixed at the value that applies at a moment just before driving stops.

Note that a structure is also possible in which each of a number of steps has a certain degree of openness assigned thereto and the pressure regulators 30 and 48 are controlled by step numbers.

Figure 2:
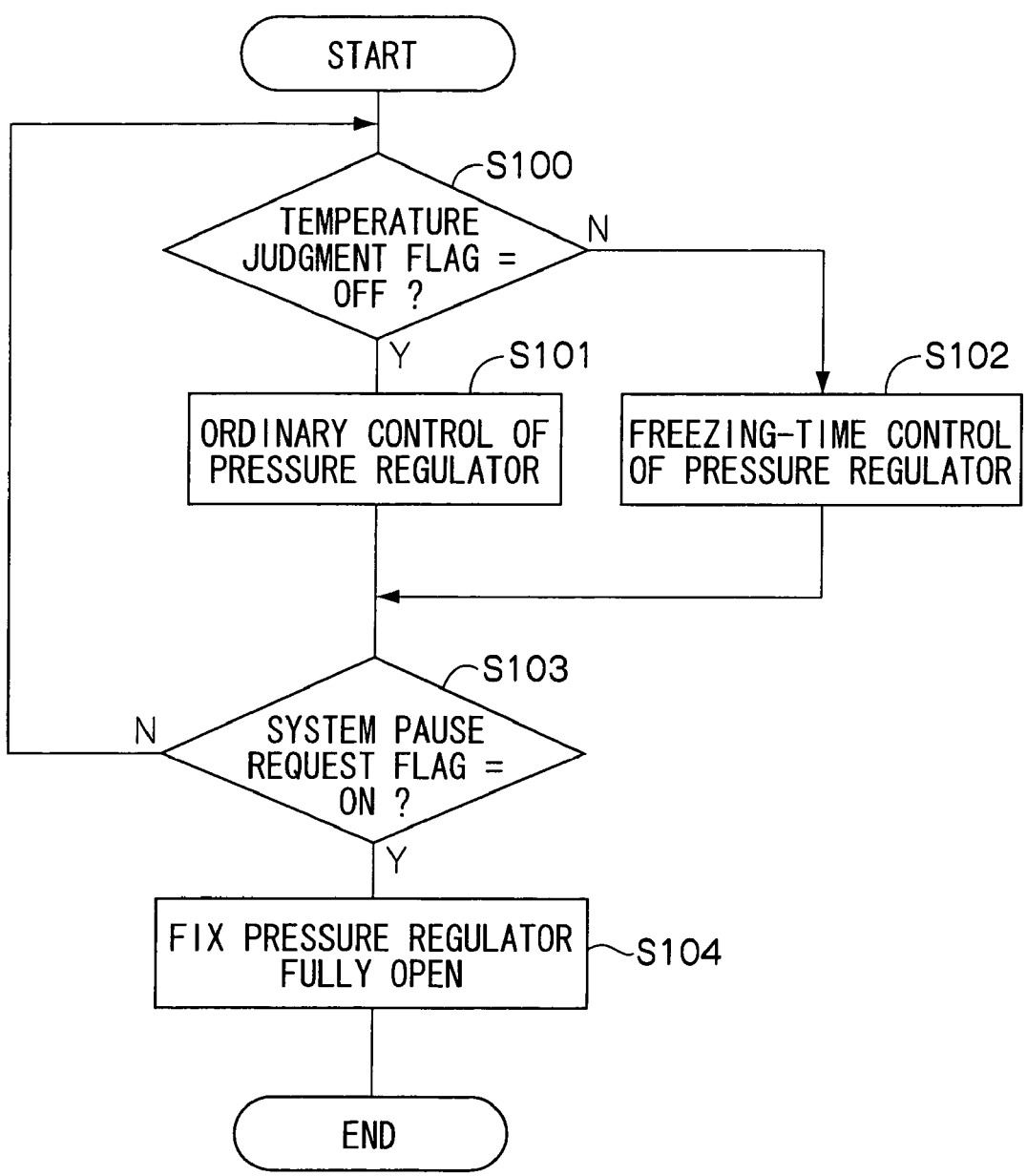
FIG. 2 is a flowchart showing a sequence for control of a pressure regulator by a control unit.
Figure 3:
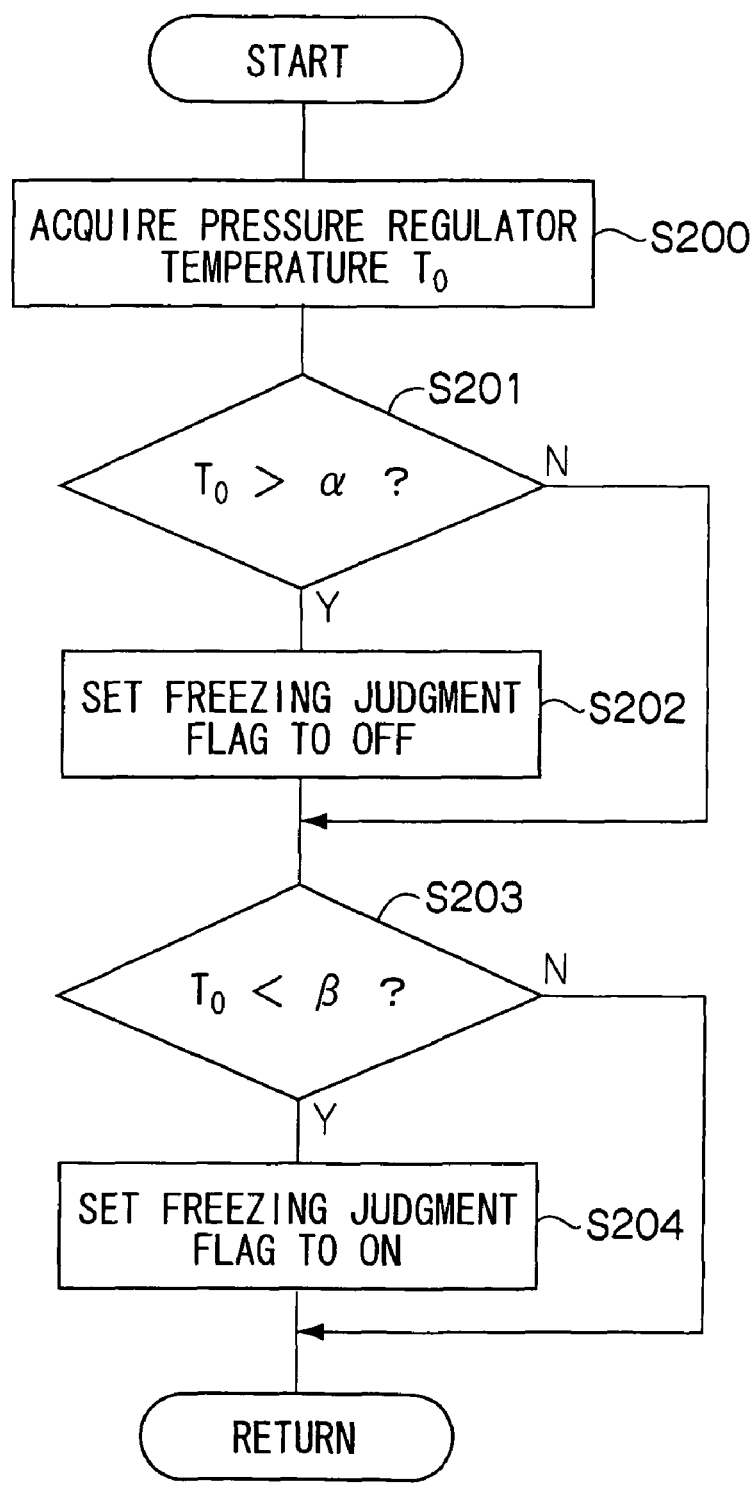
FIG. 3 is a flowchart showing a sequence of processing for judging likelihood of freezing of the pressure regulator.
Figure 4:
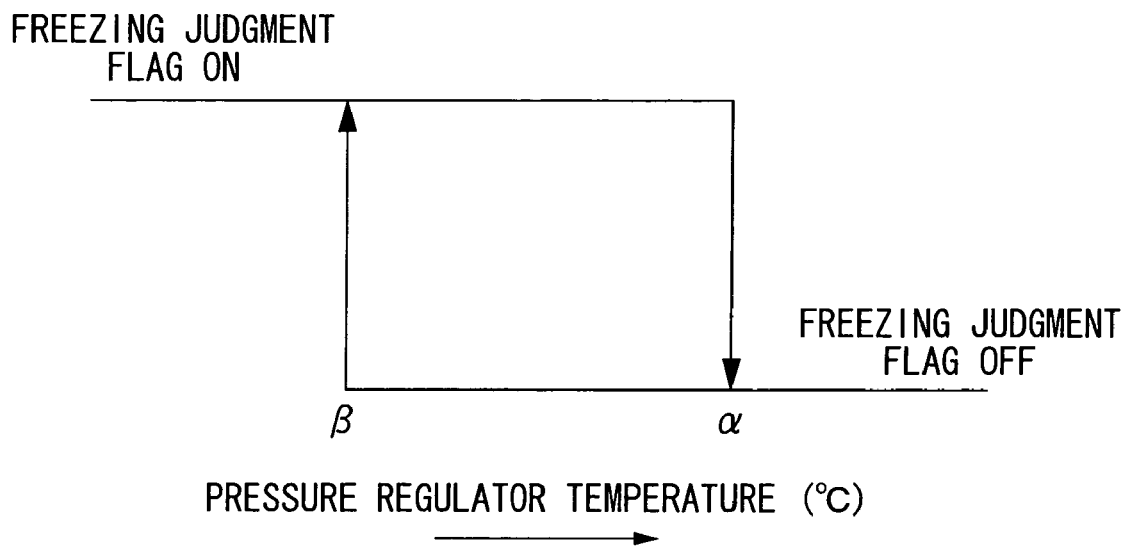
FIG. 4 is an explanatory view showing a relationship between temperature of the pressure regulator and a temperature $\alpha$ and a temperature $\beta$.

Next, a routine for control of the pressure regulators 30 and 48 by the control unit 16 will be described using FIGS. 2 to 4. Structuring the control unit 16 to include a programmable CPU will be common. First, for a main routine of pressure regulator control by the control unit 16, control of the pressure regulator 30 by the control unit 16 will be described as an example. FIG. 2 is a flowchart showing a control sequence of a pressure regulator by a control unit 16.

When the fuel cell system is started by an ignition switch being turned on by a driver or the like, a state of a temperature judgment flag that is turned 'on' or 'off' according to an interrupt routine of FIG. 3, which is to be described later, is determined by the control unit 16 (step S100). If the control unit 16 determines that the temperature judgment flag is off (a positive result in step S100), that is, that there is no likelihood of freezing of the pressure regulator, driving of the regulator is carried out as usual, and the pressure regulator is controlled to degree of openness within a range of 0 to 100% in accordance with sizes of loads (step S101). Thereafter, the routine proceeds to step S103.

On the other hand, if the control unit 16 determines that the temperature judgment flag is on (a negative result in step S100), that is, that there is a likelihood of freezing of the pressure regulator, control of the pressure regulator 30 is switched to control at times of freezing. Specifically, in control of the pressure regulator 30 by the control unit 16 at times of freezing, setting the degree of openness of the pressure regulator to less than 50% is prohibited, and the pressure regulator is controlled by driving of the pressure regulator within a range of degree of openness of 50 to 100% in accordance with sizes of loads. Then the routine proceeds to step S103. Note that a structure is possible in which, in step S102, the pressure regulator is fixed at a predetermined degree of openness from 50 to 100% (preferably 100% (fully open)), and driving of the pressure regulator is not performed at all at times of freezing.

Next, whether the state of a system pause request flag is 'on' or 'off' is determined (step S103). If the system pause request flag is determined to be off (a negative result in step S103), the routine returns to step S100, and the same process is repeated.

The system pause request flag is a flag that is turned on at times of system pause requests (times of stop requests) and is switched to on, for example, when an ignition switch is turned from on to off, the vehicle stops for more than a certain amount of time and the like, or when a requested supply of electrical power is small. Switching the system pause request flag on/off can be carried out by judging whether or not a requested drive power, which is based on, for example, whether an accelerator is on or off or the like, is smaller than a predetermined threshold value Xpw. In such a case, if it is judged that the requested drive power is smaller than the threshold value Xpw, the system pause request flag is turned on in order to request a pause of the fuel cell system.

If the control unit 16 determines that the system pause request flag is on (a positive result in step S103), the control unit 16 fixes the pressure regulator 30 in the fully open state (a degree of openness of 100%) (step S104), then carries out usual processing for a time of stopping and pauses (stops) the fuel cell system, and the routine ends.

Next, processing for judging the likelihood of freezing of the pressure regulator 30 by an interrupt routine, which is executed at predetermined time intervals, will be described using FIG. 3.

When this interrupt routine is executed, the control unit 16 acquires a temperature $T_0$ of the pressure regulator 30 from the temperature sensor 32 (step S200), and compares the temperature $T_0$ with a pre-specified temperature $\alpha$ (step S201). If the temperature $T_0$ is greater than the temperature $\alpha$ (a positive result in step S201), the control unit 16 judges that there is no likelihood of the pressure regulator 30 freezing, sets a freezing judgment flag to 'off' (step S202), and proceeds to step S203.

On the other hand, when the temperature $T_0$ is equal to or lower than $\alpha$ (a negative result in step S201), the control unit 16 compares the temperature $T_0$ with a pre-specified temperature $\beta$ (step S203). If it is judged that the temperature $T_0$ is equal to or greater than the temperature $\beta$ (a negative result in step S203), the control unit 16 maintains the freezing judgment flag as it had been judged previously without switching the flag to on or off, and the same processing will be repeated again after a certain time interval.

If the temperature $T_0$ is lower than the temperature $\beta$ (a positive result in step S203), the control unit 16 judges that there is a likelihood of freezing of the pressure regulator 30, and turns the freezing judgment flag on (step S204). Thereafter, the same processing is repeated after the certain time interval.

Thus, a hysteresis characteristic is established in which the flag is reset (to 'off') when the temperature $T_0$ changes from a temperature lower than the temperature $\alpha$ to a temperature greater than the temperature $\alpha$, and the flag is set (to 'on') when the temperature $T_0$ changes from a temperature higher than the temperature $\beta$ to a temperature lower than the temperature $\beta$, and this structure prevents 'hunting'.

Next, the temperature $\alpha$ and the temperature $\beta$, which are criteria for switching the freezing judgment flag on and off, will be discussed using FIG. 4. FIG. 4 is an explanatory view showing a relationship between temperature of a pressure regulator and the temperatures $\alpha$ and $\beta$.

The temperature $\beta$, which is the criterion for turning the freezing judgment flag on, is a value which is specified as a temperature at which there is a likelihood that the pressure regulator will freeze when the temperature falls, and will usually be set near 0° C. When the freezing judgment flag is off, if a temperature $T_0$ that is detected by the temperature sensor 32 is lower than the temperature $\beta$, the control unit 16 switches the freezing judgment flag to on.

The temperature $\alpha$, which is the criterion for turning the freezing judgment flag off, is set to a temperature which is large enough to enable correct driving when, after the pressure regulator has been frozen, the temperature rises and the frozen state is removed (for example, 5 to 10° C.). When the freezing judgment flag is on, if a temperature $T_0$ that is detected by the temperature sensor 32 is higher than the temperature $\alpha$, the control unit 16 switches the freezing judgment flag to off.

As described above, according to the fuel cell system of the present invention, when there is a likelihood that the pressure regulator 30 and the pressure regulator 48 will freeze, it is possible to prohibit setting of degrees of openness of the pressure regulators 30 and 48 to less than predetermined degrees of openness. Therefore, even when the pressure regulators freeze in very low temperatures, digging into ice, damage to driving portions and the like can be prevented. Moreover, cases of the pressure regulator freezing shut and supply pressures in the fuel cell system rising and causing damage can be avoided.

The present embodiment is a mode in which only possibilities of freezing of pressure regulators that are provided at an anode off-gas system and a cathode off-gas system of the fuel cell stack 10 are judged, and only degrees of openness thereof are controlled accordingly. However, a structure which carries out control similarly for valves provided in a gas unit (supply/exhaust means) which is responsible for supply and exhaust of the reaction gases, e.g., a flow control valve or the like, is also possible, and mechanisms which counteract freezing of valves in combination with heaters and the like may be provided.

According to the fuel cell system of the present invention, the following are provided: a fuel cell; a gas unit (gas supply/exhaust means) which supplies and exhausts gas used in electricity generation to and from the fuel cell; a pressure regulator which is provided at the gas unit (gas supply/exhaust means) and regulates pressure of the gas supplied and exhausted at the fuel cell in accordance with the size of a load; a freezing judgment section (means) which judges whether or not there is a likelihood of freezing of a predetermined region including the pressure regulator; and a pressure regulator control unit which prohibits setting of a degree of openness of the pressure regulator to below a predetermined degree of openness when it is judged by the freezing judgment section (means) that there is a likelihood of freezing (a controller or control means). Thus, when there is a probability that the fuel cell system (particularly the pressure regulator) will freeze in very low temperature conditions or the like, it is possible to prohibit the pressure regulator from going below the predetermined degree of openness.

As a result, problems such as the pressure regulator being fixed in a shut state by freezing, a valve thereof becoming unable to open and proper driving thereof becoming impossible, and consequently pressure within the fuel cell system being excessively high and the fuel cell system being damaged or the like can be avoided.

Furthermore, by providing a temperature detector (means), which detects temperature, at the freezing judgment section (means), external temperature, temperature of the pressure regulator or the like can be detected. Accordingly, it is possible to judge whether or not freezing is likely by reference to the detected temperature. In consequence, the likelihood of freezing can be detected more reliably.

Further, modes in which, when it is judged by the freezing judgment section (means) that there is a likelihood of freezing, the degree of openness of the pressure regulator is fixed at the predetermined degree of openness or greater and control of the pressure regulator is not carried out at times of freezing are also possible.

As a result, the pressure regulator can be more reliably prevented from biting into ice. Moreover, damage to the pressure regulator due to the pressure regulator being driven during freezing can be avoided.

Further again, if the pressure regulator is fixed at the predetermined degree of openness or greater by the pressure regulator control unit (controller or control means) when the fuel cell is stopped, it is possible to ensure that the pressure regulator will always be in a state which is open by at least the predetermined degree of openness when the fuel cell is started.

Thus, a situation in which the pressure regulator freezes during a period in which the fuel cell is stopped and driving of the pressure regulator hence becomes impossible can be avoided, and problems such as reaction gas pressure being excessively high when the fuel cell is started and the fuel cell system being damaged or the like can be avoided.

When solid polymer electrolyte fuel cells are used for the fuel cell and the pressure regulator that is controlled by the pressure regulator control unit (controller or control means) is provided at the cathode off-gas system, damage due to freezing of water that remains in the cathode off-gas system can be more reliably prevented.

INDUSTRIAL APPLICABILITY

The present invention can be employed in various fuel cell systems which are provided with gas supply and exhaust systems, such as fuel cells for mounting at vehicles, and can pre-emptively prevent damage to gas pressure regulation valves that are provided at the gas supply and exhaust systems due to freezing of retained water at times of cold.

What is claimed is:

1. A fuel cell system comprising:
   a fuel cell;
   gas supply/exhaust means for supplying and exhausting gas, which is used in electricity generation, to and from the fuel cell, the gas supply/exhaust means being provided with at least one valve, the at least one valve being provided on an exhaust pipe that is directly connected to the fuel cell;
   freezing judgment means for judging whether or not there is a likelihood of a predetermined location, which includes the at least one valve, freezing; and
   control means for, when the freezing judgment means judges that there is the likelihood of freezing, prohibiting a degree of openness of the at least one valve from becoming less than a predetermined degree of openness.

2. The fuel cell system of claim 1, wherein the freezing judgment means comprises temperature detection means for detecting a temperature of the predetermined location of the fuel cell system, and judges that there is the likelihood of freezing when the temperature that is detected by the temperature detection means is less than a predetermined temperature.

3. The fuel cell system of claim 1, wherein the freezing judgment means comprises temperature detection means for detecting an external air temperature, and judges that there is the likelihood of freezing when the external air temperature that is detected by the temperature detection means is less than a predetermined temperature.

4. A fuel cell system comprising:
   a fuel cell;
   gas supply/exhaust means for supplying and exhausting gas, which is used in electricity generation, to and from the fuel cell;
   a pressure regulator which is provided at the gas supply/exhaust means and which regulates pressure of the gas which is supplied and exhausted to and from the fuel cell in accordance with size of a load, the pressure regulator being provided on an exhaust pipe that is directly connected to the fuel cell;
   freezing judgment means for judging whether or not there is a likelihood of a predetermined location, which includes the pressure regulator, freezing; and
   control means for, when the freezing judgment means judges that there is the likelihood of freezing, prohibiting a degree of openness of the pressure regulator from becoming less than a predetermined degree of openness.

5. The fuel cell system of claim 4, wherein the freezing judgment means comprises temperature detection means for detecting a temperature of the predetermined location of the fuel cell system, and judges that there is the likelihood of freezing when the temperature that is detected by the temperature detection means is less than a predetermined temperature.

6. The fuel cell system of claim 4, wherein the freezing judgment means comprises temperature detection means for detecting an external air temperature, and judges that there is the likelihood of freezing when the external air temperature that is detected by the temperature detection means is less than a predetermined temperature.

7. The fuel cell system of claim 4, wherein, when the freezing judgment means judges that there is the likelihood of freezing, the control means fixes the pressure regulator at least the predetermined degree of openness.

8. The fuel cell system of claim 4, wherein the control means fixes the pressure regulator at least the predetermined degree of openness when the fuel cell is stopped.

9. The fuel cell system of claim 4, wherein the fuel cell comprises a solid polymer electrolyte fuel cell, the gas supply/exhaust means comprises a cathode off-gas system, and the pressure regulator is provided at the cathode off-gas system.

10. The fuel cell system of claim 1, wherein the control means prohibits the degree of openness of the at least one valve from becoming less than the predetermined degree of openness during the electricity generation.

* * * * *